United States Patent
Ogura et al.

(10) Patent No.: US 10,867,365 B2
(45) Date of Patent: Dec. 15, 2020

(54) IMAGE PROCESSING APPARATUS, IMAGE PROCESSING METHOD, AND IMAGE PROCESSING SYSTEM FOR SYNTHESIZING AN IMAGE

(71) Applicant: SONY CORPORATION, Tokyo (JP)

(72) Inventors: Sho Ogura, Kanagawa (JP); Hidetoshi Nagano, Kanagawa (JP)

(73) Assignee: SONY CORPORATION, Tokyo (JP)

(*) Notice: Subject to any disclaimer, the term of this patent is extended or adjusted under 35 U.S.C. 154(b) by 194 days.

(21) Appl. No.: 15/747,219

(22) PCT Filed: Jun. 30, 2016

(86) PCT No.: PCT/JP2016/069457
§ 371 (c)(1),
(2) Date: Jan. 24, 2018

(87) PCT Pub. No.: WO2017/026193
PCT Pub. Date: Feb. 16, 2017

(65) Prior Publication Data
US 2019/0005613 A1    Jan. 3, 2019

(30) Foreign Application Priority Data

Aug. 12, 2015 (JP) .................... 2015-159519

(51) Int. Cl.
*G06T 3/40* (2006.01)
*G06T 19/00* (2011.01)
(Continued)

(52) U.S. Cl.
CPC .............. *G06T 3/40* (2013.01); *G06K 9/3241* (2013.01); *G06T 3/4038* (2013.01); *G06T 7/194* (2017.01);
(Continued)

(58) Field of Classification Search
CPC ......... G06K 9/3241; G06T 3/40; G06T 7/194; G06T 19/00; G06T 3/4038; H04N 5/23229; H04N 5/23296; H04N 5/272
See application file for complete search history.

(56) References Cited

U.S. PATENT DOCUMENTS 5,657,073 A * 8/1997 Henley ................. G03B 37/04
348/38
8,368,762 B1 * 2/2013 Chen .................... H04N 17/002
348/187
(Continued)

FOREIGN PATENT DOCUMENTS

JP       08-116487 A     5/1996
JP     2005-020559 A     1/2005
(Continued)

OTHER PUBLICATIONS

Aliprandi et al. ("Image-based three-dimensional free viewpoint video synthesis," 3DTV Conference: The True Vision—Capture, Transmission and Display of 3D Video, May 4-6, 2009) (Year: 2009).*

(Continued)

*Primary Examiner* — Yubin Hung
(74) *Attorney, Agent, or Firm* — Chip Law Group

(57) ABSTRACT

A scale transformation adjustment unit performs a scale transformation corresponding to a change of an image range with respect to an actual image by using a scale transformation by an optical zoom of an image pickup unit that generates the actual image, and generates a coordinate transformation matrix including the scale transformation.

9 Claims, 10 Drawing Sheets

(51) Int. Cl.
  *H04N 5/272* (2006.01)
  *G06T 7/194* (2017.01)
  *G06K 9/32* (2006.01)
  *H04N 5/232* (2006.01)

(52) U.S. Cl.
  CPC ......... *G06T 19/00* (2013.01); *H04N 5/23229* (2013.01); *H04N 5/23296* (2013.01); *H04N 5/272* (2013.01)

(56) References Cited

U.S. PATENT DOCUMENTS

| | | | | |
|---|---|---|---|---|
| 8,937,617 | B1* | 1/2015 | Mudure | G06T 17/05 345/419 |
| 2001/0010546 | A1* | 8/2001 | Chen | H04N 5/23293 348/218.1 |
| 2002/0154912 | A1* | 10/2002 | Koseki | H04N 5/23293 396/429 |
| 2003/0076413 | A1* | 4/2003 | Kanade | H04N 5/2627 348/139 |
| 2005/0062845 | A1* | 3/2005 | Mills | H04N 5/23216 348/36 |
| 2006/0241792 | A1* | 10/2006 | Pretlove | G06Q 50/00 700/83 |
| 2007/0238981 | A1* | 10/2007 | Zhu | A61B 90/36 600/424 |
| 2009/0154293 | A1* | 6/2009 | Sengupta | F01D 21/003 367/118 |
| 2009/0273717 | A1* | 11/2009 | Masaoka | H04N 5/232 348/620 |
| 2010/0208033 | A1* | 8/2010 | Edge | G06T 19/006 348/46 |
| 2010/0277474 | A1* | 11/2010 | Ishihara | G06T 15/60 345/419 |
| 2011/0035767 | A1* | 2/2011 | Lee | H04N 7/17318 725/24 |
| 2011/0096149 | A1* | 4/2011 | Au | G08B 13/19608 348/47 |
| 2011/0164116 | A1* | 7/2011 | Gay | G06T 19/006 348/47 |
| 2011/0241976 | A1* | 10/2011 | Boger | G02B 27/0176 345/8 |
| 2012/0098992 | A1* | 4/2012 | Hosoe | H04N 5/23219 348/222.1 |
| 2012/0099004 | A1* | 4/2012 | Shibuno | H04N 5/23209 348/240.3 |
| 2013/0303248 | A1* | 11/2013 | Williams | H04N 21/8547 463/6 |
| 2014/0320592 | A1* | 10/2014 | Amadio | H04N 7/142 348/36 |
| 2016/0219218 | A1* | 7/2016 | Kinoshita | H04N 5/30 |

FOREIGN PATENT DOCUMENTS

| | | |
|---|---|---|
| JP | 2010-226753 A | 10/2010 |
| JP | 2012-039591 A | 2/2012 |

OTHER PUBLICATIONS

International Search Report and Written Opinion of PCT Application No. PCT/JP2016/069457, dated Aug. 16, 2016, 07 pages.

* cited by examiner

IMAGE PROCESSING APPARATUS, IMAGE PROCESSING METHOD, AND IMAGE PROCESSING SYSTEM FOR SYNTHESIZING AN IMAGE

CROSS REFERENCE TO RELATED APPLICATIONS

This application is a U.S. National Phase of International Patent Application No. PCT/JP2016/069457 filed on Jun. 30, 2016, which claims priority benefit of Japanese Patent Application No. JP 2015-159519 filed in the Japan Patent Office on Aug. 12, 2015. Each of the above-referenced applications is hereby incorporated herein by reference in its entirety.

TECHNICAL FIELD

The present technology relates to an image processing apparatus, an image processing method, a program, and an image processing system, and makes it possible to maintain a resolution of an actual image to be good in a synthesis image of a virtual image and the actual image.

BACKGROUND ART

In related art, an MR (Mixed Reality) technology that an actual world and a virtual space created by a computer are fused together is known. This technology is capable of presenting, to an observer, an object in the actual world just like the object exists in a virtual space. Therefore, by applying the technology to a field of an image production, for example, it is possible to achieve a virtual studio. In the virtual studio, a foreground image subjected to coordinate transformation to an image from a desired point of view and a studio background are synthesized, with an actual image generated by an image pickup unit as the foreground image and a virtual image generated by a computer or the like as the studio background. The synthesis process makes it possible to generate a synthesis image just like a subject in a foreground exists in a virtual studio.

In synthesizing the foreground image as the actual image and the studio background as the virtual image, positions and sizes are adjusted so as not to generate a sense of strangeness between the foreground image and the studio background. Further, the size of the foreground image can be adjusted by using an optical zoom or a digital zoom (electronic zoom). For example, Patent Literature 1 discloses such a technology that a subject is scaled up by a digital zoom, and then an optical zoom is performed slowly, thereby making it possible to perform quick, silent zoom.

CITATION LIST

Patent Literature

Patent Literature 1: Japanese Patent Application Laid-open No. 2010-226753

DISCLOSURE OF INVENTION

Technical Problem

Incidentally, when a subject is scaled up by the digital zoom, and then the optical zoom is performed therefor, a resolution is lowered before the optical zoom is started. Thus, in a case where a foreground image as an actual image is scaled up, in a synthesis image, only a resolution of the foreground image may be deteriorated.

In view of this, the present technology has an object to provide an image processing apparatus, an image processing method, a program, and an image processing system capable of maintaining the resolution of the actual image in the synthesis image of the actual image and the virtual image to be good.

Solution to Problem

According to a first aspect of the present technology, there is provided an image processing apparatus including a scale transformation adjustment unit that performs a scale transformation in coordinate transformation to draw an actual image to be synthesized with a virtual image in a virtual space by using a scale transformation by an optical zoom of an image pickup unit that generates the actual image.

In this technology, the scale transformation adjustment unit performs the scale transformation in the coordinate transformation to draw the actual image to be synthesized with the virtual image in the virtual space by using a scale transformation by an optical zoom of an image pickup unit that generates the actual image. Further, the scale transformation in the coordinate transformation is performed by using the scale transformation by the optical zoom and scale transformation not by the optical zoom, and the scale transformation by the optical zoom is adjusted in such a manner that more scale transformation by the optical zoom is performed, and image clipping of a desired subject in the actual image in the synthesis image generated by the synthesis is prevented. In addition, the scale transformation adjustment unit obtains, from the image pickup unit, an information signal that enables a scale transformation state of the optical zoom to be determined, and in a case where the scale transformation state of the optical zoom determined on a basis of the information signal causes a difference with the scale transformation in the coordinate transformation, compensates for the difference by the scale transformation not by the optical zoom. An image pickup control unit outputs a control signal corresponding to the scale transformation by the optical zoom to the image pickup unit, thereby causing an actual image that has been subjected to the scale transformation by the optical zoom after the adjustment to be generated in the image pickup unit. Further, the scale transformation adjustment unit determines an image pickup direction to set an optical center of the optical zoom to a position of a desired subject in the actual image, and the image pickup control unit performs control to set an image pickup direction of the image pickup unit to the direction determined by the scale transformation adjustment unit. Furthermore, the scale transformation adjustment unit adjusts coordinate transformation to draw the actual image in the virtual space in such a manner that control of the image pickup direction cancels an influence generated in the desired subject in the actual image.

Further, the image processing apparatus further includes: a coordinate transformation matrix generation unit that generates a coordinate transformation matrix corresponding to a position and a direction of a viewpoint in the virtual space and a zoom factor; an image extraction unit that extracts an image of a desired subject from a pickup image generated by the image pickup unit as the actual image; and an image synthesis unit that synthesizes the virtual image after coordinate transformation and the actual image extracted by the image extraction unit, in which the scale transformation adjustment unit generates such a coordinate transformation matrix that the coordinate transformation matrix according to the zoom factor includes a scale transformation by the optical zoom on a basis of the coordinate transformation matrix generated by the coordinate transformation matrix generation unit, and the image synthesis unit performs, for the virtual image, coordinate transformation by using the coordinate transformation matrix generated by the coordinate transformation matrix generation unit, and performs, for the actual image extracted by the image extraction unit, a coordinate transformation by using the coordinate transformation matrix generated by the scale transformation adjustment unit.

According to a second aspect of the present technology, there is provided an image processing method including performing a scale transformation in a coordinate transformation to draw an actual image to be synthesized with a virtual image in a virtual space by using a scale transformation by an optical zoom of an image pickup unit that generates the actual image.

According to a third aspect of the present technology, there is provided a program causing a computer to synthesize a virtual image and an actual image, the program causing the computer to execute the step of performing a scale transformation in a coordinate transformation to draw the actual image to be synthesized with the virtual image in a virtual space by using a scale transformation by an optical zoom of an image pickup unit that generates the actual image.

According to a fourth aspect of the present technology, there is provided an image processing system including: an image pickup unit that generates an actual image; an operation unit that performs an operation for a position and a direction of a viewpoint in the virtual space and a zoom factor; and an image processing unit that draws a virtual image and an actual image generated by the image pickup unit in a virtual space in accordance with the operation in the operation unit, and synthesizes the virtual image and the actual image drawn in the virtual space, in which the image processing unit includes a coordinate transformation matrix generation unit that generates a coordinate transformation matrix according to the operation by the operation unit, a scale transformation adjustment unit that generates such a coordinate transformation matrix that a coordinate transformation matrix according to the zoom factor with respect to the actual image includes a scale transformation by the optical zoom on a basis of the coordinate transformation matrix generated by the coordinate transformation matrix generation unit, and an image extraction unit that extracts an image of a desired subject from a pickup image generated by the image pickup unit as the actual image, an image synthesis unit that performs a coordinate transformation with respect to the virtual image by using the coordinate transformation matrix generated by the coordinate transformation matrix generation unit, performs a coordinate transformation with respect to the actual image extracted by the image extraction unit by using the coordinate transformation matrix generated by the scale transformation adjustment unit, and synthesizes the virtual image and the actual image after coordinate transformations, and an image pickup control unit that outputs a control signal corresponding to the scale transformation by the optical zoom to the image pickup unit, and causes the actual image that has been subjected to the scale transformation by the optical zoom to be generated in the image pickup unit.

Advantageous Effects of Invention

According to the present technology, the scale transformation in the coordinate transformation to draw the actual image to be synthesized with the virtual image in the virtual space is performed by using the scale transformation by the optical zoom of the image pickup unit that generates the actual image. Therefore, it is possible to maintain the resolution of the actual image in the synthesis image of the actual image and the virtual image to be good. It should be noted that the effects described in this description merely examples and are not limited, and additional effects may be obtained.

MODE (S) FOR CARRYING OUT THE INVENTION

Hereinafter, modes for carrying out the present technology will be described. It should be noted that description will be given in the following order.

1. Configuration and operation of image processing system
2. About image processing unit
2-1. Configuration of image processing unit
2-2. Operation of image processing unit
2-3. Another operation of image processing unit <1. Configuration and Operation of Image Processing System>

Figure 1:
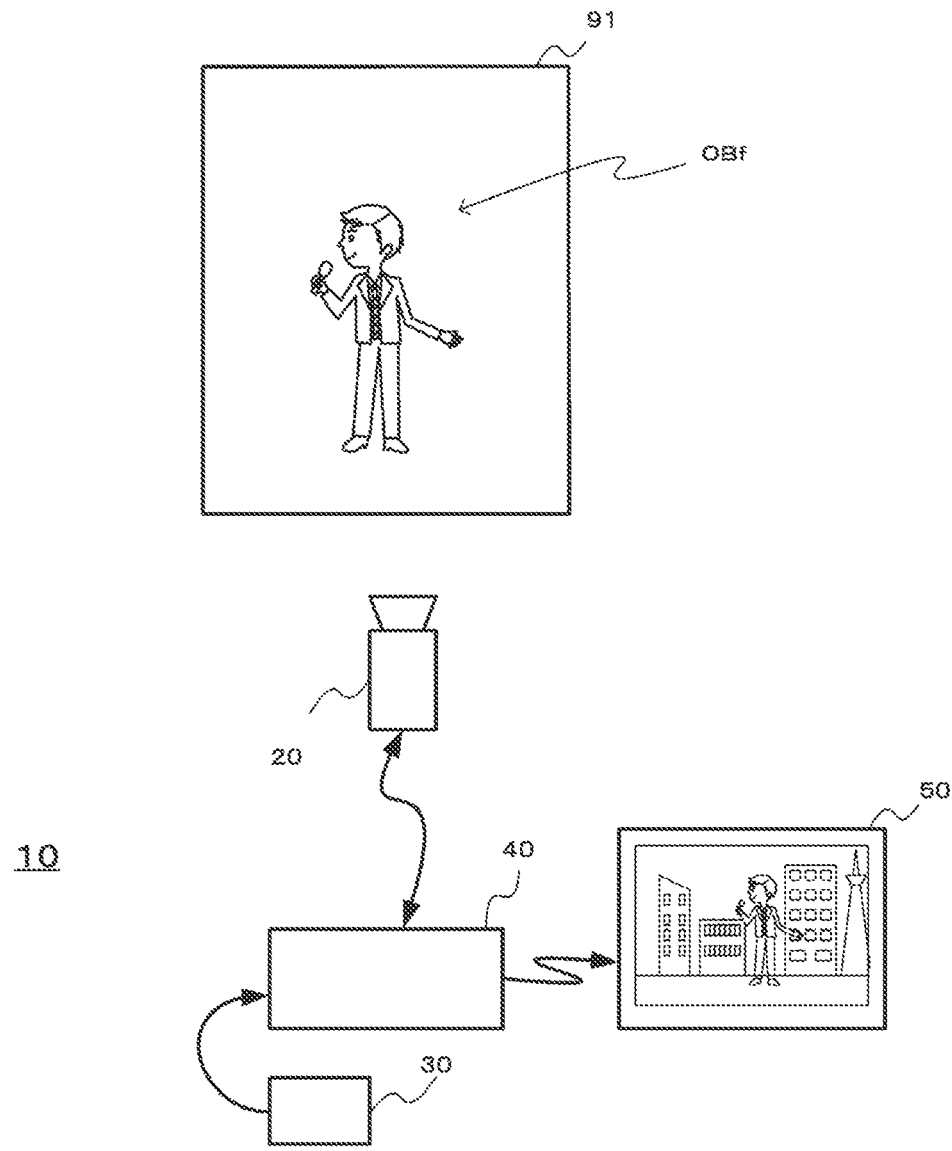
FIG. 1 A diagram showing an example of a configuration of an image processing system.

FIG. 1 is a diagram showing an example of a configuration of an image processing system. An image processing system 10 includes an image pickup unit 20, an operation unit 30, an image processing unit 40, and an image display unit 50.

The image pickup unit 20 generates a captured image of a desired subject OBf and outputs the image to the image processing unit 40. The image pickup unit 20 includes a zoom lens and is capable of adjusting a field angle by an optical zoom operation on a basis of a control signal from the image processing unit 40. Further, the image pickup unit 20 notifies the image processing unit 40 of an information signal that indicates a scale transformation state or the like by an optical zoom. Furthermore, the image pickup unit 20 may have a pan and tilt function to perform panning and tilting on a basis of a control signal from the image processing unit 40. It should be noted that an image of the subject OBf is captured with a greenback 91 as a background, for example, in such a manner that only the image of the subject OBf can be extracted by the image processing unit 40 from the captured image generated by the image pickup unit 20.

The operation unit 30 outputs an operation signal according to a user operation to the image processing unit 40. For example, the operation unit 30 generates an operation signal according to a zooming operation and outputs the operation signal to the image processing unit 40. Further, in a case where the image pickup unit 20 has a pan and tilt mechanism, the operation unit 30 generates an operation signal according to a panning and tilting operation and outputs the operation signal to the image processing unit 40.

The image processing unit 40 extracts an image of the subject OBf from the captured image generated by the image pickup unit 20 as a foreground image, and pastes the foreground image as an actual image on a background image as a virtual image to generate a synthesis image. Further, the image processing unit 40 generates a synthesis image that has been subjected to zooming, panning, tilting, or the like on a basis of the operation signal from the operation unit 30. The image processing unit 40 outputs an image signal of the generated synthesis image to the image display unit 50.

The image display unit 50 performs image display on a basis of the image signal supplied from the image processing unit 40 and displays an image just like the subject in the foreground exists in the background of the virtual image.

Figure 2:
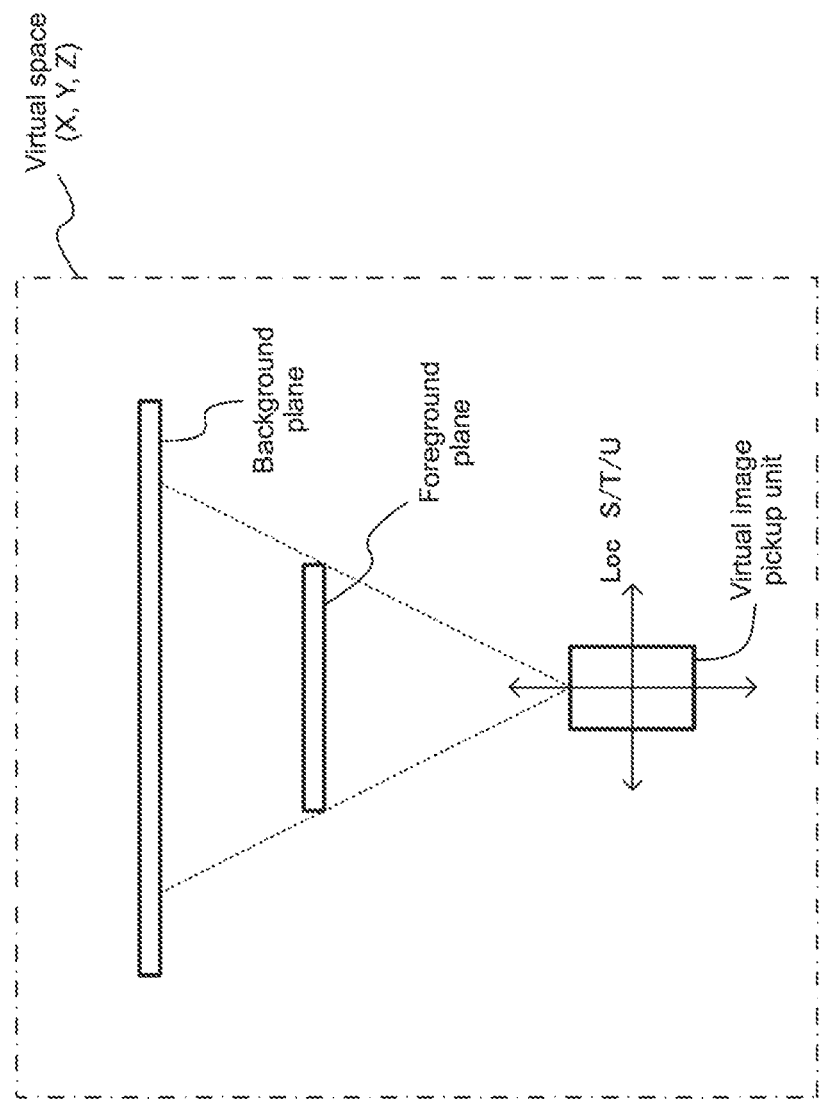
FIG. 2 A diagram for explaining a generation of a synthesis image.

In the image synthesis system configured as described above, the images are synthesized in such a manner that a scale of the background as the virtual image and a scale of the foreground as the actual image show the same change. FIG. 2 is a diagram for explaining a generation of a synthesis image. For example, a background plane and a foreground plane are provided in a virtual space, the background as the virtual image is pasted on the background plane, and an image of a desired subject as the actual image is pasted on the foreground plane. Further, the image on the foreground plane and the image of the background plane are superimposed, and thus a synthesis image corresponding to a case where the subject and the images of the background are captured from a virtual image pickup unit set in front of the foreground plane is generated. In the operation unit 30, an operation signal according to a setting operation of a position, orientation, and zoom factor of the virtual image pickup unit is generated, and the image processing unit 40 generates a synthesis image corresponding to a position, orientation, and zoom factor of a viewpoint set by a user, that is, a synthesis image corresponding to the position, orientation, zoom factor, and the like of the virtual image pickup unit. It should be noted that in FIG. 2, the virtual space is set as a world coordinate system (X, Y, Z), and a coordinate system with the virtual image pickup unit as a reference is set as a location coordinate system (S, T, U).

As described above, the image synthesis system uses the optical zoom of the image pickup unit 20, thereby maintaining the resolution of the actual image in the synthesis image, that is, the subject image of the captured image pasted on the foreground plane to be good. It should be noted that the synthesis image may be a moving image or a still image.

<2. About Image Processing Unit>

[2-1. Configuration of Image Processing Unit]

Figure 3:
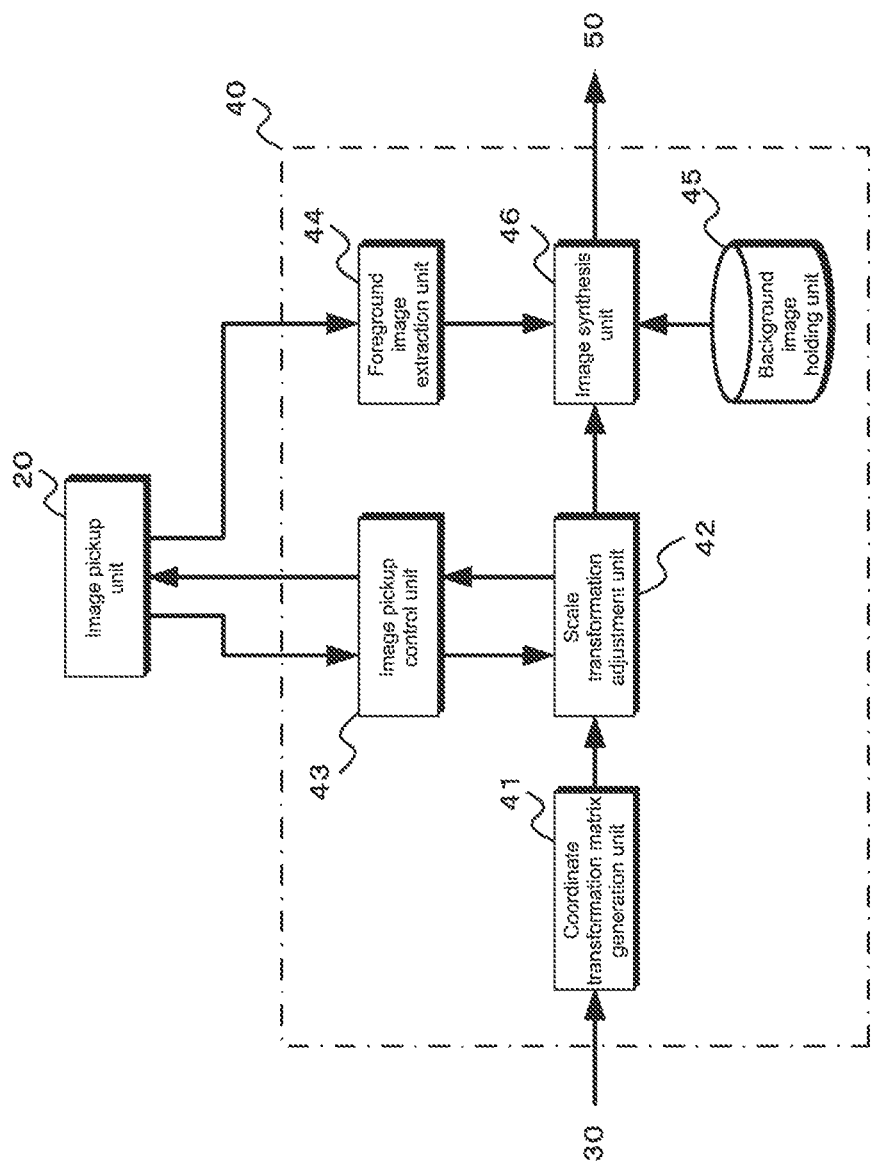
FIG. 3 A diagram showing an example of a configuration of an image processing unit.

Subsequently, a configuration of the image processing unit will be described. FIG. 3 is a diagram showing an example of the configuration of the image processing unit. The image processing unit 40 includes a coordinate transformation matrix generation unit 41, a scale transformation adjustment unit 42, an image pickup control unit 43, a foreground image extraction unit 44, a background image holding unit 45, and an image synthesis unit 46.

On a basis of the operation signal from the operation unit 30, the coordinate transformation matrix generation unit 41 generates a background coordinate transformation matrix in accordance with the position, orientation, and zoom factor of the virtual image pickup unit set by the user. The coordinate transformation matrix generation unit 41 outputs a generated coordinate transformation matrix to the scale transformation adjustment unit 42. An expression (1) indicates the background coordinate transformation matrix. The expression (1) shows a relationship between a point (position (x, y) in screen coordinates) in the background image as the virtual image and a point (position (X, Y, Z) in world coordinates) corresponding thereto in the virtual space. Expressions (2) to (5) exemplify a transformation matrix of "S", "P", "V", "M" in the expression (1). As shown in the expression (2), "S" is a transformation matrix of a scaling transformation. In the expression (2), "s" indicates a scale component. As shown in expression (3), "P" is a transformation matrix of a projection transformation. In a case where an area where projection is performed by a transformation matrix of the projection transformation is set as a visual field space, in the expression (3), "h" indicates a width of the visual field space in a y axis direction, "w" indicates a width of the visual field space in an x axis direction, "Near" indicates a front-side Z coordinate of the visual field space, and "Far" indicates a rear-side Z coordinate of the visual field space. Further, regarding "f", "f=cot(fovy/2)" is established when a view angle of the visual field space is set as fovy. As shown in the expression (4), "V" is a transformation matrix of a viewing transformation. In the expression (4), "$r_0$ to $r_8$" indicate rotation components, and "$t_x$, $t_y$, and $t_z$" indicate parallel shift components. As shown in expression (5), "M" is a transformation matrix of a modeling transformation. It should be noted that the transformation matrixes of "S", "P", "V", and "M" are not limited to the transformation matrixes shown in the expression (2) to expression (5).

[Mathematical 1]

$$\begin{bmatrix} X \\ Y \\ Z \\ W \end{bmatrix} = SPVM \begin{bmatrix} x \\ y \\ 0 \\ 1 \end{bmatrix} \quad (1)$$

$$S = ScaleMatrix = \begin{bmatrix} s & 0 & 0 & 0 \\ 0 & s & 0 & 0 \\ 0 & 0 & 1 & 0 \\ 0 & 0 & 0 & 1 \end{bmatrix} \quad (2)$$

$$P = ProjectionMatrix = \begin{bmatrix} \frac{h}{w}f & 0 & 0 & 0 \\ 0 & f & 0 & 0 \\ 0 & 0 & \frac{Near+Far}{Near-Far} & 2\frac{NearFar}{Near-Far} \\ 0 & 0 & -1 & 0 \end{bmatrix} \quad (3)$$

$$V = ViewMatrix = \begin{bmatrix} r_0 & r_1 & r_2 & t_x \\ r_3 & r_4 & r_5 & t_y \\ r_6 & r_7 & r_8 & t_z \\ 0 & 0 & 0 & 1 \end{bmatrix} \quad (4)$$

$$M = ModelMatrix = \begin{bmatrix} 1 & 0 & 0 & 0 \\ 0 & -1 & 0 & 0 \\ 0 & 0 & -1 & 0 \\ 0 & 0 & 0 & 1 \end{bmatrix} \quad (5)$$

The scale transformation adjustment unit 42 performs a scale transformation in a coordinate transformation for drawing an actual image to be synthesized with a virtual image in the virtual space by using a scale transformation by the optical zoom of the image pickup unit that generates the actual image. That is, on a basis of the background coordinate transformation matrix generated by the coordinate transformation matrix generation unit 41, the scale transformation adjustment unit 42 generates a foreground coordinate transformation matrix in such a manner that a scale of the background image as the virtual image and a scale of the foreground image as the actual image show the same change. The scale transformation adjustment unit 42 configures a scale component (zoom factor of the foreground image) of the foreground coordinate transformation matrix by an optical scale component and/or a non-optical scale component. The optical scale component is a scale transformation by an optical zoom using a zoom lens of the image pickup unit, and the non-optical scale component is a scale transformation by a scale transformation not by the optical zoom, that is, by an electronic zoom. The optical zoom is the scale transformation using the zoom lens, so deterioration of the resolution is not caused at a time when the desired subject is zoomed in unlike the electronic zoom, for example.

The scale transformation adjustment unit 42 determines an optimal optical scale component capable of maintaining the resolution of the foreground image to be good. In determining the optimal optical scale component, the scale transformation adjustment unit 42 adjusts the optical scale component in such a manner that more scale transformations by the optical zoom are caused. For example, at a time when a zoom-in operation is performed by the virtual image pickup unit, the foreground image is scaled up by the optical zoom so as to be capable of maintaining the resolution of the foreground image to be good. Further, the scale transformation adjustment unit 42 adjusts the optical scale component so as not to cause image frame clipping to be described later even if the foreground image is scaled up by the optical zoom, and determines the optimal optical scale component. Further, in a case where the optimal optical scale component has a difference with the foreground scale component, the scale transformation adjustment unit 42 sets the difference to be the non-optical scale component not by the optical zoom. The scale transformation adjustment unit 42 notifies the image pickup control unit 43 of the determined optimal optical scale component. Further, in a case where a scale transformation state of the optical zoom determined on a basis of the information signal obtained from the image pickup unit 20 through the image pickup control unit 43 has a difference with the scale transformation of the optimal optical zoom after the adjustment, the scale transformation adjustment unit 42 makes up for the difference by the scale transformation not by the optical zoom.

The scale transformation adjustment unit 42 outputs the foreground coordinate transformation matrix generated by using the optimal optical scale component to the image synthesis unit 46 along with the background coordinate transformation matrix generated by the coordinate transformation matrix generation unit 41.

Here, when the transformation matrix based on the optimal optical scale component is set as "$S_{optimize}$", and the transformation matrix based on the non-optical scale component is set as "S1", transformation matrix "S" of the scaling transformation of the background image is a product of the transformation matrix "S1" and the transformation matrix "$S_{optimize}$". Thus, as shown in an expression (6), the scale transformation adjustment unit 42 generates the foreground coordinate transformation matrix on a basis of the background coordinate transformation matrix. It should be noted that when the optical scale is changed in the virtual space, changing of the optical scale gives an influence on another coordinate transformation. Thus, the scale transformation adjustment unit 42 uses, with respect to "P", "V", and "M" of the background transformation matrix, "P'", "V'", and "M'" according to the optical scale component in the foreground coordinate transformation matrix.

[Mathematical 2]

$$\underbrace{\begin{bmatrix} X \\ Y \\ Z \\ W \end{bmatrix} = SPVM \begin{bmatrix} x \\ y \\ 0 \\ 1 \end{bmatrix}}_{\text{Background coordinate transformation matrix}} = \underbrace{S_1 P'V'M'S_{optimize} \begin{bmatrix} x \\ y \\ 0 \\ 1 \end{bmatrix}}_{\text{Foreground coordinate transformation matrix}} \quad (6)$$

Further, the scale transformation adjustment unit 42 uses the expression (6) to perform determination of image frame clipping. For example, the scale transformation adjustment unit 42 sets a temporary value as the optical scale component and generates the foreground coordinate transformation matrix on the basis of the expression (6).

Figure 4:
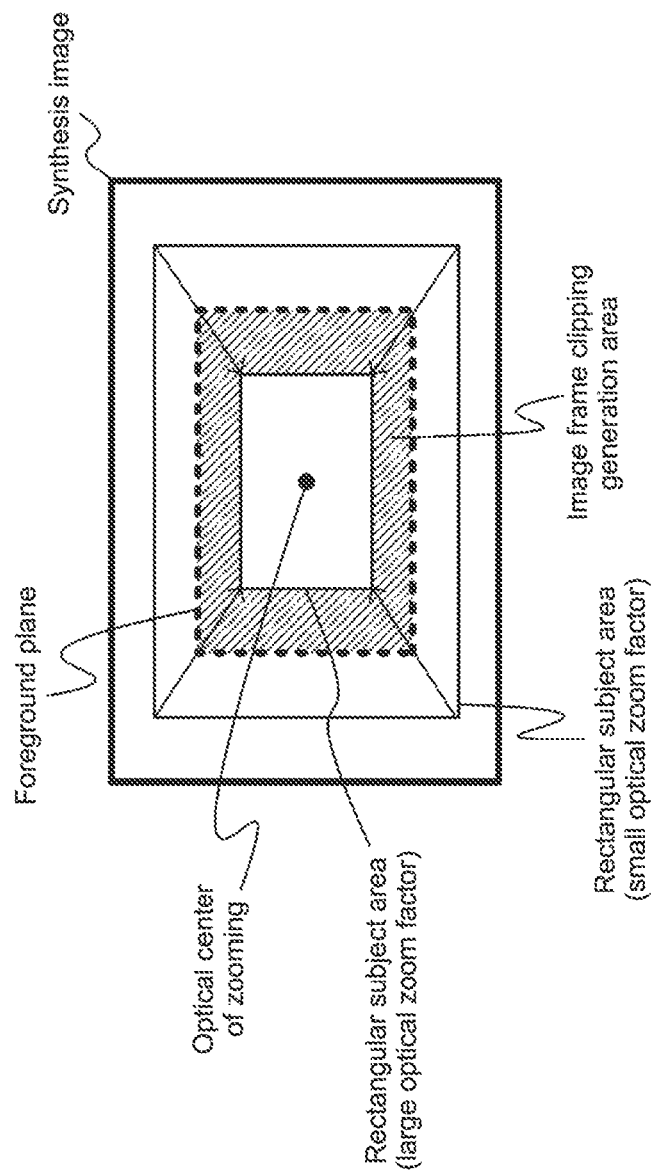
FIG. 4 A diagram for explaining image frame clipping.

Further, the scale transformation adjustment unit 42 uses the generated foreground coordinate transformation matrix to calculate an outline position of the desired subject, and performs determination of the image frame clipping on a basis of a relationship between the calculated outline position and the foreground plane. The scale transformation adjustment unit 42 sets a rectangular subject area so as to include the desired subject on a basis of the calculated outline position. FIG. 4 is a diagram for explaining the image frame clipping. FIG. 4 exemplifies a case where an aspect ratio of the rectangular subject area coincides with an aspect ratio of the foreground plane. Further, the rectangular subject area and the foreground plane have a coincided center position. Here, in a case where the zoom factor of the optical zoom is small, a superimposed area of the foreground plane and the synthesis image is included in the rectangular subject area including the photographed desired subject. Thus, in the superimposed area, image lacking of the desired subject in the actual image is not caused. However, when the zoom factor of the optical zoom is increased, and the field angle is narrowed, in the superimposed area, an area indicated by shaded lines which is not included in the rectangular subject area is generated. The area indicated by the shaded lines is an area in which image lacking of the desired subject is caused due to the narrow field angle. That is, the area showing the desired subject becomes smaller than the superimposed area, with the result that the image frame clipping is caused. Thus, the scale transformation adjustment unit 42 determines that the image frame clipping is not caused when the rectangular subject area includes an entire superimposed area, and determines that the image frame clipping is caused in a case where the superimposed area which is not included in the rectangular subject area is generated.

In a case where the aspect ratio of the rectangular subject area is different from the aspect ratio of the foreground plane, the scale transformation adjustment unit 42 sets a vertical direction as a comparison target area when the desired subject is, for example, a standing person, and the rectangular subject area is vertically longer than the superimposed area of the foreground plane and the synthesis image. Further, in a case where the desired subject is, for example, a lying person, and the rectangular subject area is horizontally longer than the superimposed area, the scale transformation adjustment unit 42 sets a horizontal direction as comparison target range. The scale transformation adjustment unit 42 determines that the image frame clipping is not caused when the comparison target range includes the entire superimposed area, and determines that the image frame clipping is caused in a case where the superimposed area which is not included in the comparison target range is generated.

It should be noted that the scale transformation adjustment unit 42 uses the image of the desired subject which is extracted from the captured image generated by the image pickup unit 20, and thus can determine a position of the rectangular subject area in a scale transformation state based on the information signal obtained from the image pickup control unit 43. Thus, in accordance with an optical scale component difference between the optical scale component in the scale transformation state based on the obtained information signal and the set temporary value, the scale transformation adjustment unit 42 performs the scale transformation for the rectangular subject area in the scale transformation state based on the obtained information signal. As a result, the scale transformation adjustment unit 42 can calculate the position of the rectangular subject area corresponding to the temporary value.

The image pickup control unit 43 generates a control signal on a basis of the optical scale component notified from the scale transformation adjustment unit 42 and outputs the control signal to the image pickup unit 20 to cause the optical zoom operation to be performed. Further, the image pickup control unit 43 obtains an information signal that indicates a scale transformation state or the like of the optical zoom from the image pickup unit 20 and outputs the information signal to the scale transformation adjustment unit 42.

The foreground image extraction unit 44 extracts, from the captured image generated by the image pickup unit 20, an image of the subject OBf as the foreground image and outputs the image to the image synthesis unit 46.

In the background image holding unit 45, a virtual image for the background is stored. The background image holding unit 45 outputs the background image held therein to the image synthesis unit 46.

The image synthesis unit 46 uses the foreground coordinate transformation matrix generated by the scale transformation adjustment unit 42 to perform coordinate transformation of the foreground image extracted by the foreground image extraction unit 44, and pastes the foreground image as the actual image on the foreground plane in the virtual space. Further, the image synthesis unit 46 uses the background coordinate transformation matrix generated by the coordinate transformation matrix generation unit 41 to perform coordinate transformation of the background image held in the background image holding unit 45, and pastes the background image as the virtual image on the background plane in the virtual space. Further, the image synthesis unit 46 superimposes a synthesis foreground image pasted on the foreground plane on a synthesis background image pasted on the background plane, and generates a synthesis image corresponding to an image obtained by capturing an image of the foreground plane and background plane from the virtual image pickup unit shown in FIG. 2. The image synthesis unit 46 outputs the generated synthesis image to the image display unit 50.

Here, in a case where the foreground in the virtual space is set as a plane, the foreground as a taken image and the foreground plane have a plane-to-plane relationship. Therefore, in the transformation expression shown in the expression (6) and an expression (7), a foreground coordinate transformation matrix can be expressed as an expression (8) in a case where the foreground is set as a plane. That is, when the foreground in the virtual space is set as a plane, a scale change in the virtual space can be shifted to a scale change of an optical zoom.

[Mathematical 3]

$$\begin{bmatrix} X \\ Y \\ Z \\ W \end{bmatrix} = SPVM \begin{bmatrix} x \\ y \\ 0 \\ 1 \end{bmatrix} \quad (7)$$

$$\begin{bmatrix} X \\ Y \\ W \end{bmatrix} = SPVM \begin{bmatrix} x \\ y \\ 1 \end{bmatrix} = H \begin{bmatrix} x \\ y \\ 1 \end{bmatrix} = H'S_{optimize} \begin{bmatrix} x \\ y \\ 1 \end{bmatrix} = H' \begin{bmatrix} S_{optimize}x \\ S_{optimize}y \\ 1 \end{bmatrix} \quad (8)$$

Thus, in a state in which the foreground in the virtual space is set as a plane, the image processing unit 40 adjusts the optical scale component in the scale transformation as described above, and maintains the resolution of the actual image in the synthesis image to be good.

[2-2. Operation of Image Processing Unit]

Figure 5:
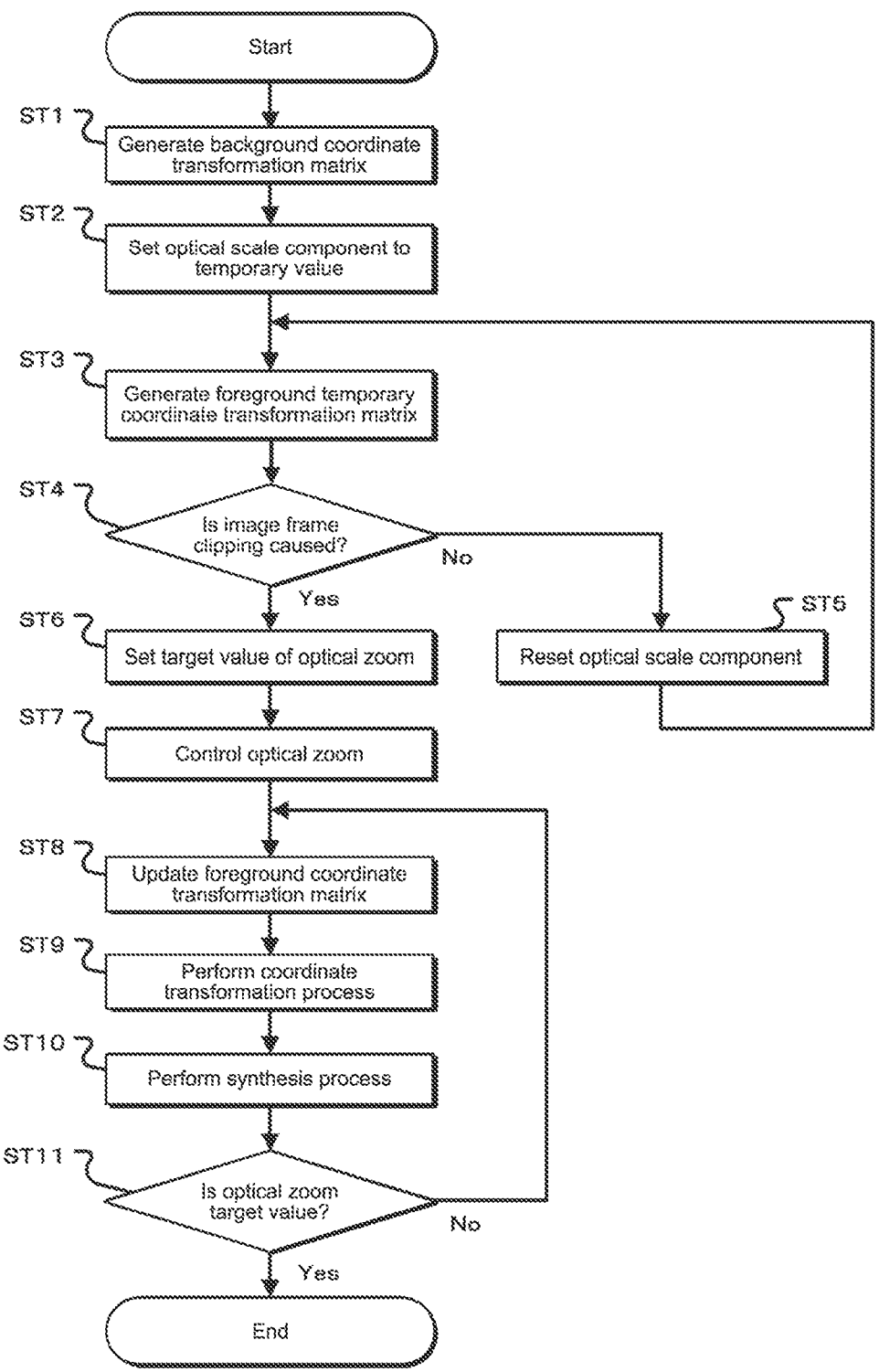
FIG. 5 A flowchart showing an operation of the image processing unit.

Subsequently, an operation of the image processing unit will be described. FIG. 5 is a flowchart showing an operation of the image processing unit.

In Step ST1, the image processing unit generates a background coordinate transformation matrix. In accordance with the position, orientation, and zoom factor of the virtual image pickup unit set on a basis of the operation signal from the operation unit, the image processing unit generates the background coordinate transformation matrix, and the process proceeds to Step ST2.

In Step ST2, the image processing unit sets the optical scale component as a temporary value. As the optical scale component for performing zooming, the image processing unit drives the zoom lens of the image pickup unit to set a maximum value or the like in an adjustment range of the optical scale component as the temporary value, and the process proceeds to Step ST3. It should be noted that the zoom factor of the optical scale component is increased, as the scale component becomes larger.

In Step ST3, the image processing unit generates a foreground temporary coordinate transformation matrix. The image processing unit uses the background coordinate transformation matrix generated in Step ST1 and the optical scale component set in Step ST2 or in Step ST5 to be described later to generate the foreground temporary coordinate transformation matrix, and the process proceeds to Step ST4.

In Step ST4, the image processing unit determines whether image frame clipping of the foreground image is generated or not. In a case where the image frame clipping is generated, the image processing unit causes the process to proceed to Step ST5, and in a case where the image frame clipping is not generated, the process proceeds to Step ST6.

In Step ST5, the image processing unit resets the optical scale component. Because the image frame clipping is generated, to change the optical zoom to a direction so as not to generate the image frame clipping, the image processing unit resets the optical scale component, and the process returns to Step ST3. Here, in a case where the zoom factor is increased as the scale component becomes larger, the optical scale component is made to be smaller.

When it is determined that the image frame clipping is not generated in Step ST4, and the process proceeds to Step ST6, the image processing unit sets a target value of the optical zoom. The image processing unit sets the target value of the optical zoom in accordance with the set optical scale component, and the process proceeds to Step ST7.

In Step ST7, the image processing unit performs optical zoom control. The image processing unit controls the zoom lens of the image pickup unit to achieve the target value set in Step ST6, and the process proceeds to Step ST8.

In Step ST8, the image processing unit updates the foreground coordinate transformation matrix. The image processing unit updates the foreground coordinate transformation matrix in accordance with the scale transformation state based on the background coordinate transformation matrix and an information signal from the image pickup unit, and the process proceeds to Step ST9. It should be noted that the first foreground coordinate transformation matrix is a coordinate transformation matrix equal to the background coordinate transformation matrix.

In Step ST9, the image processing unit performs a coordinate transformation process. The image processing unit uses the background coordinate transformation matrix set in Step ST1 to perform the coordinate transformation of the background image and generate the synthesis background image. Further, the image processing unit obtains an image generated by the image pickup unit and extracts the foreground image. Further, the image processing unit uses the foreground coordinate transformation matrix updated in Step ST8 to perform the coordinate transformation of the foreground image after the extraction and generate the synthesis foreground image, and the process proceeds to Step ST10.

In Step ST10, the image processing unit performs a synthesis process. The image processing unit superimposes the synthesis foreground image on the synthesis background image generated in Step ST9 to generate the synthesis image, and the process proceeds to Step ST11.

In Step ST11, the image processing unit determines whether the optical zoom is the target value or not. For example, in a case where the optical zoom is not the target value during a zoom operation, the image processing unit causes the process to proceed to Step ST8. Further, in a case where the optical zoom is the target value, the image processing unit terminates the operation.

The image processing unit performs the operation control as described above, with the result that it is possible to maintain the resolution of the actual image in the synthesis image of the actual image and the virtual image to be good.

Figure 6A:
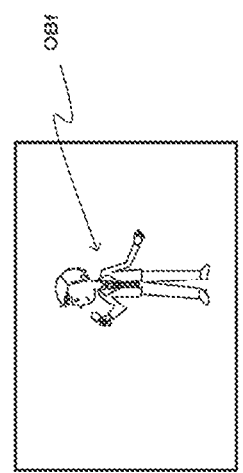
FIGS. 6(a), 6(b), 6(c), 6(d), and 6(e) A Diagrams showing an example of an optical zoom and a synthesis image.
Figure 6B:
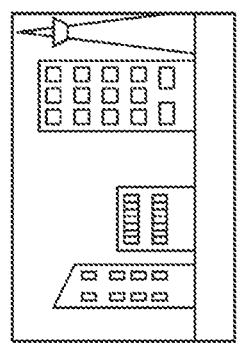
Figure 6C:
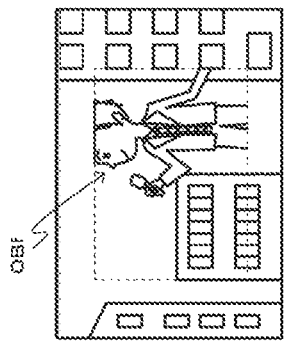
Figure 6D:
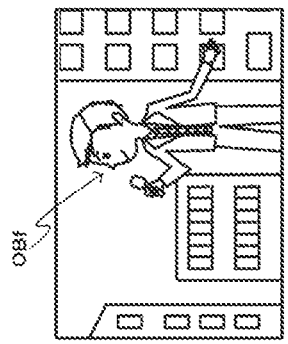
Figure 6E:
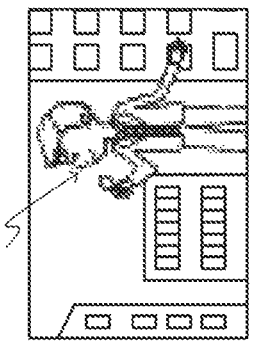

FIGS. 6(a), 6(b), 6(c), 6(d), and 6(e) exemplifies a relationship between the optical zoom and the synthesis image. FIG. 6(a) exemplifies the foreground image, and FIG. 6(b) exemplifies the background image. Here, when the optical scale component is large (optical zoom factor is large), in the synthesis image, as shown in FIG. 6(c), the image frame clipping may be generated, and a desired subject OBf image (actual image) may be clipped. For this reason, as shown in FIG. 6(d), the image processing unit generates a synthesis image in which the resolution of the desired subject OBf image is maintained to be good without generating the image frame clipping with the optical scale component as a maximum value which does not generate the image frame clipping. It should be noted that FIG. 6(e) exemplifies a case where the optical scale component is small, and the desired subject in the actual image is scaled up by the electronic zoom as the non-optical zoom. In a case where the desired subject OBf is scaled up by the non-optical zoom, as the non-optical scale component becomes larger, the resolution of the desired subject OBf image is lowered. Thus, even if a scale-up background image having a good resolution is generated by computer graphics, it is impossible to generate a synthesis image having a good resolution because the resolution of the foreground image to be synthesized with the scale-up background image is lowered.

Further, in consideration of transition of the optical zoom to the target value, the image processing unit calculates a non-optical scale component that satisfies a desired zoom change from the optical scale component during the transition, and performs electronic zoom for the optical zoom of the optical scale component and the calculated non-optical scale component. The image processing unit may achieve the desired zoom change by setting the optical scale component and the non-optical scale component as described above.

Figure 7A:
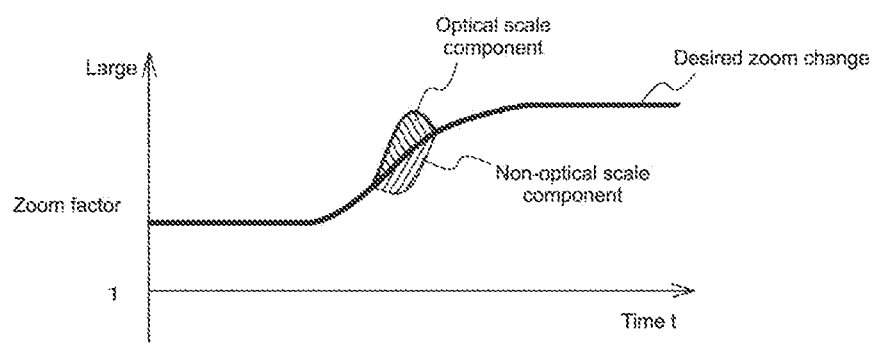
FIGS. 7(a), 7(b), and 7(c) Diagrams showing an example of an operation in a case where a desired zoom change is performed.
Figure 7B:
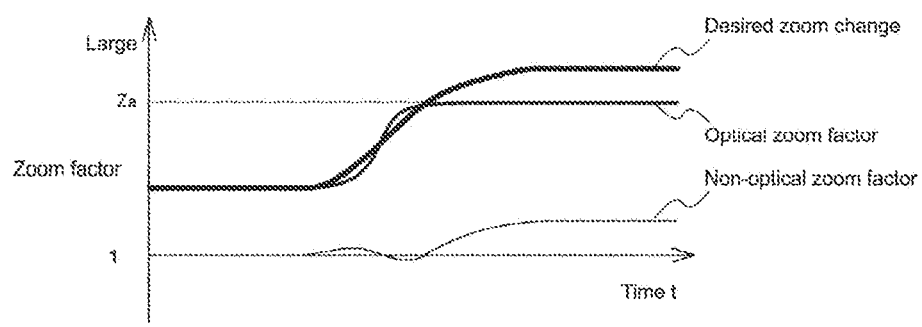
Figure 7C:
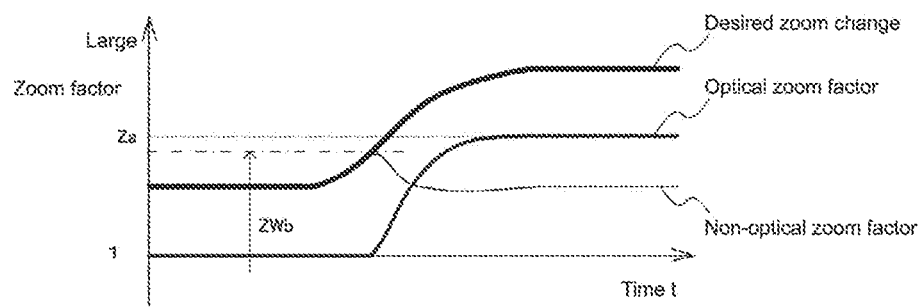

FIGS. 7(a), 7(b), and 7(c) exemplifies an operation in a case where the desired zoom change. As shown in FIG. 7(a), in a case where the zoom factor is larger than the desired zoom change due to the optical scale component, the image processing unit lowers the zoom factor by the non-optical scale component to achieve the desired zoom change.

Further, the image processing unit may prioritize the optical zoom to perform the desired zoom change. Further, the image processing unit may perform the non-optical zoom within an acceptable range of deterioration of the resolution, and may use the optical zoom in a case where the resolution may be deteriorated beyond the acceptable range, to perform the desired zoom change without deteriorating the resolution beyond the acceptable range.

FIG. 7(b) exemplifies a case where the desired zoom change is performed by prioritizing the optical zoom. The image processing unit adjusts the optical scale component so as to achieve the desired zoom change, generates a control signal in accordance with the optical scale component, and controls the optical zoom operation of the image pickup unit 20. Further, the image processing unit 40 determines a scale transformation state (zoom factor) of the optical zoom on a basis of information signal from the image pickup unit 20, and in a case where the zoom factor of the optical zoom is lower than the desired zoom factor, compensates for the lack of the zoom factor with the non-optical zoom. Further, in a case where the zoom factor of the optical zoom becomes a maximum zoom factor Za which does not cause the image frame clipping, a difference between the zoom factor of the optical zoom and desired zoom factor is compensated with the non-optical zoom. As a result, it is possible to perform zooming with the resolution of the actual image in the synthesis image maintained to be good.

FIG. 7(c) exemplifies a case where the non-optical zoom is performed within an acceptable range of resolution deterioration. In a case where the desired zoom change is within the acceptable range of resolution deterioration ZWb, the image processing unit performs zooming with the non-optical scale component. Further, in a case where the desired zoom change exceeds the acceptable range of resolution deterioration ZWb, the image processing unit 40 adjusts the optical scale component so as not to further deteriorate the resolution, generate a control signal in accordance with the optical scale component, and controls the optical zoom of the image pickup unit 20. Further, on a basis of the information signal from the image pickup unit 20, the image processing unit 40 determines the scale transformation state (zoom factor) of the optical zoom, and compensates for a difference between the optical zoom factor and the desired zoom factor with the non-optical zoom. Further, in a case where the optical zoom factor becomes the maximum zoom factor Za which does not cause the image frame clipping, the difference between the optical zoom factor and the desired zoom factor is compensated with the non-optical zoom. As a result, it is possible to prevent the resolution of the actual image in the synthesis image from being deteriorated beyond acceptable range. Further, the optical zoom is performed when the resolution may be deteriorated beyond the acceptable range, so driving the optical zoom is reduced, making it possible to save power consumption of the image pickup unit 20.

[2-3. Another Operation of Image Processing Unit]

Subsequently, as another operation of the image processing unit, a case where operations of panning and tilting in addition to the zooming will be described. When an optical center in zooming is apart from a position of the desired subject, image frame clipping is likely to be caused.

Figure 8A:
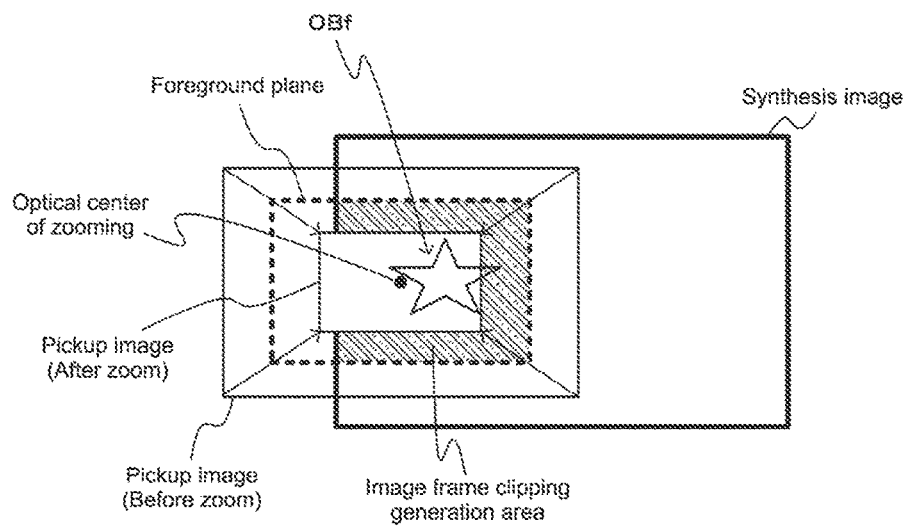
FIGS. 8(a) and 8(b) Diagrams for explaining a relationship between an optical center of zooming and image frame clipping.
Figure 8B:
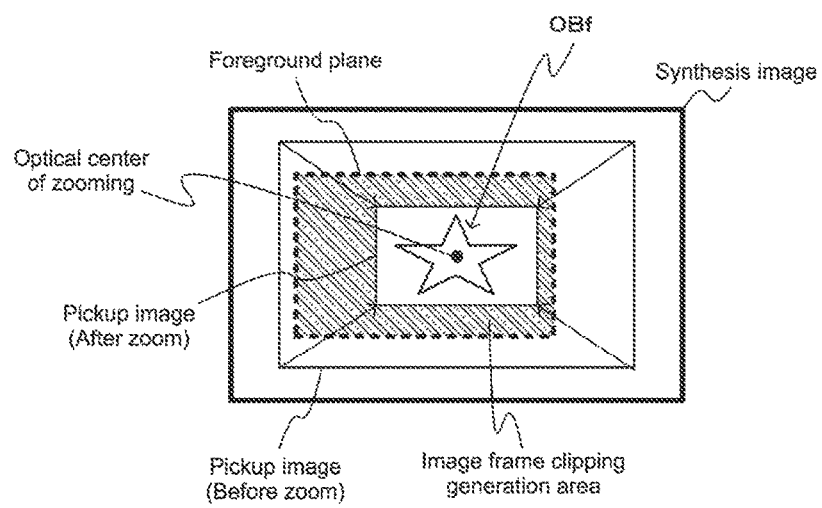

FIGS. 8(a) and 8(b) are diagrams for explaining a relationship between the optical center of the zooming and the image frame clipping. (a) of FIG. 8(a) exemplifies a case where the optical center of the zooming is apart from a center of the desired subject OBf indicated by a star sign, and FIG. 8(b) exemplifies a case where the optical center in the zooming is at a position of the desired subject OBF indicated by the star sign.

As shown in FIG. 8(a), when the optical center of the zooming is apart from the center of the desired subject OBf, the zooming causes an image of a subject part included in a shaded area to be clipped. However, as shown in FIG. 8(b), when the optical center of the zooming is at the center position of the desired subject OBf, if the zooming is performed at the same zoom factor as in the case of FIG. 8(a), the subject OBf is not included in the shaded area. Therefore, the image of subject OBf is not clipped. That is, by setting the optical center in the zooming to the position of the desired subject, it is possible to increase the zoom factor that does not cause the image frame clipping. That is, more scale components can be distributed to optical scale components, with the result that deterioration of the resolution is more difficult to be caused, and a synthesis image can be generated at the desired zoom factor with the resolution thereof maintained to be good.

In view of this, in another operation of the image processing unit, the scale transformation adjustment unit performs determination of the optimal optical scale component and determination of an image pickup direction (pan component and tilt component) in which the optical center in the optical zoom is set as the position of desired subject. Further, the image pickup control unit generates a control signal corresponding to the determined optical scale component, pan component, and tilt component and outputs the signal to the image pickup unit, thereby causing the image pickup unit to perform panning and tilting in such a manner that the optical center in the zooming and optical zoom is set as the position of the desired subject. Further, when the image pickup unit performs the operation of panning and tilting, and the image pickup direction is changed, in an image of the desired subject of the taken image, an influence due to the change of the image pickup direction is caused. Thus, even if the image pickup unit performs the operation of panning and tilting, the scale transformation adjustment unit adjusts the coordinate transformation to draw the foreground image in the virtual space in order to obtain the foreground image that the zooming is performed in the state before the panning and tilting operation is performed.

The change due to the panning and tilting operation can be considered as a plane change. Thus, in a case where a projection transformation matrix according to the panning and tilting operation in which the optical center of the zooming is set as the position of the desired subject is represented as "$H_{optimize}$", on a basis of an expression (9), coordinates (x, y) of the panning and tilting in which the optical center of the zooming is set as the position of the desired subject can be transformed into coordinates (x', y') that the influence of the panning and tilting is canceled. Thus, on a basis of the expression (10), the coordinate transformation is performed by using the projection transformation matrix $H_{optimize}$ with respect to the foreground image after the zooming, it is possible to generate a synthesis foreground image in which the influence due to the panning and tilting operation is canceled on the virtual space side.

[Mathematical 4]

$$\begin{bmatrix} x' \\ y' \\ 1 \end{bmatrix} = H_{optimize} \begin{bmatrix} x \\ y \\ 1 \end{bmatrix} \quad (9)$$

$$\begin{bmatrix} X \\ Y \\ W \end{bmatrix} = SPVM \begin{bmatrix} x \\ y \\ 1 \end{bmatrix} = H \begin{bmatrix} x \\ y \\ 1 \end{bmatrix} = H' H_{optimize} \begin{bmatrix} x \\ y \\ 1 \end{bmatrix} = H' \begin{bmatrix} x' \\ y' \\ 1 \end{bmatrix} \quad (10)$$

Figure 9:
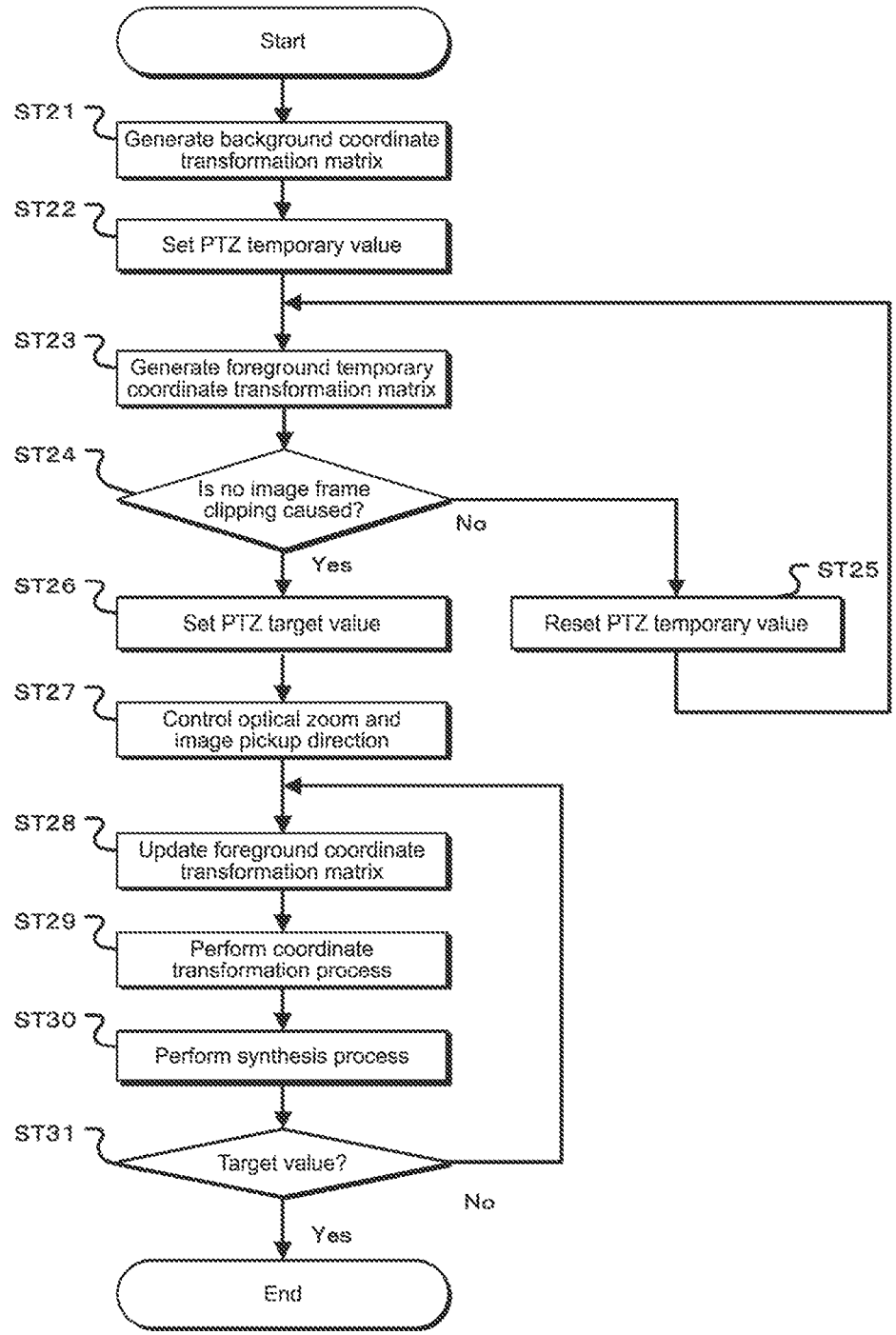
FIG. 9 A flowchart showing an operation of the image processing unit including panning and tilting.

FIG. 9 is a flowchart showing an operation of the image processing unit including not only the zooming but also the panning and tilting.

In Step ST21, the image processing unit generates a background coordinate transformation matrix. The image processing unit generates the background coordinate transformation matrix in accordance with the position, orientation, and zoom factor of the virtual image pickup unit set on a basis of an operation signal from the operation unit, and the process proceeds to Step ST22.

In Step ST22, the image processing unit performs PTZ temporary value setting. The image processing unit uses a zoom lens of the image pickup unit to set, as a temporary value, for example, a maximum value of an adjustment range of the optical scale component as the optical scale component for performing zooming. It should be noted that the zoom factor of the optical scale component becomes larger as the scale component is increased. Further, the image processing unit sets the temporary value to an initial value for a pan component and a tilt component for adjusting the image pickup direction, and the process proceeds to Step ST23.

In Step ST23, the image processing unit generates a foreground temporary coordinate transformation matrix. The image processing unit uses the background coordinate transformation matrix generated in Step ST21 and the optical scale component, pan component, and tilt component set in Step ST22 or in Step ST25 to be described later to generate the foreground temporary coordinate transformation matrix, and the process proceeds to Step ST24.

In Step ST24, the image processing unit determines whether image frame clipping of the foreground image is caused or not. In the case where the image frame clipping is caused, the image processing unit causes the process to proceed to Step ST25, and in the case where the image frame clipping is not caused, the image processing unit causes the process to proceed to Step ST26.

In Step ST25, the image processing unit resets the PTZ temporary value. Because the image frame clipping is caused, the image processing unit resets the temporary value of the optical scale component, pan component, and tilt component to a direction in which the image frame clipping is not caused. For example, in a case where the image frame clipping is caused on a right side of the foreground image, resetting of the pan component is performed in such a manner that the image pickup direction is shifted rightward. In a case where the image frame clipping is caused on an upper side of the image, resetting of the tilt component is performed in such a manner that the image pickup direction is shifted upward. Further, in a case where the image frame clipping is caused on right and left sides of the foreground image or upper and lower sides thereof, the optical scale component is reset so as to lower the zoom factor. In accordance with an occurrence condition of the image frame clipping, the image processing unit resets the optical scale component, pan component, and tilt component, and the process returns to Step ST23.

When it is determined that the image frame clipping is not generated in Step ST24, and the process proceeds to Step ST26, the image processing unit sets a PTZ target value. In accordance with the optical scale component at a time when the image frame clipping is not generated, the image processing unit sets the target value of the optical zoom. Further, in accordance with the pan component and tilt component at a time when the image frame clipping is not generated, the image processing unit sets a target value of the panning and tilting, and the process proceeds to Step ST27.

In Step ST27, the image processing unit controls the optical zoom and the image pickup direction. The image processing unit controls the zoom lens of the image pickup unit or the pan and tilt mechanism so as to achieve the target value set in Step ST26, and the process proceeds to Step ST28.

In Step ST28, the image processing unit updates the foreground coordinate transformation matrix. In accordance with the background coordinate transformation matrix and the optical scale component in the scale transformation state based on the information signal from the image pickup unit, or the pan component and tilt component based on the information signal, the image processing unit updates the foreground coordinate transformation matrix, and the process proceeds to Step ST29. It should be noted that the first foreground coordinate transformation matrix is a coordinate transformation matrix equal to the background coordinate transformation matrix.

In Step ST29, the image processing unit performs a coordinate transformation process. The image processing unit uses the background coordinate transformation matrix set in Step ST21 to perform the coordinate transformation of the background image and generate a synthesis background image. Further, the image processing unit obtains the image generated by the image pickup unit and extracts a foreground image. Further, the image processing unit uses the foreground coordinate transformation matrix updated in Step ST29 to perform coordinate transformation for the extracted foreground image and generate a synthesis foreground image. Then, the process proceeds to Step ST30.

In Step ST30, the image processing unit performs a synthesis process. The image processing unit superimposes the synthesis foreground image on the synthesis background image generated in Step ST29 to generate a synthesis image. Then, the process proceeds to Step ST31.

In Step ST31, the image processing unit determines whether the target value is achieved. The image processing unit determines whether the optical zoom and the panning and tilting are the target value or not. In a case where the optical zoom and the panning and tilting are in operation, and are not the target value, the image processing unit causes the process to return to Step ST28. Further, in a case where the optical zoom and the panning and tilting are the target value, the image processing unit terminates the operation.

Through the process as described above, not only the optical zoom but also the panning and tilting are performed so as not to cause the image frame clipping, with the result that a good resolution is maintained, and the synthesis image can be generated in which the image pickup direction is adjusted in such a manner that the image frame clipping is not caused in the desired subject. Further, in the foreground image, it is possible to cancel the influence of the panning and tilting in such a manner that distribution to the optical scale component is increased even if the panning and tilting are performed.

Figure 10A:
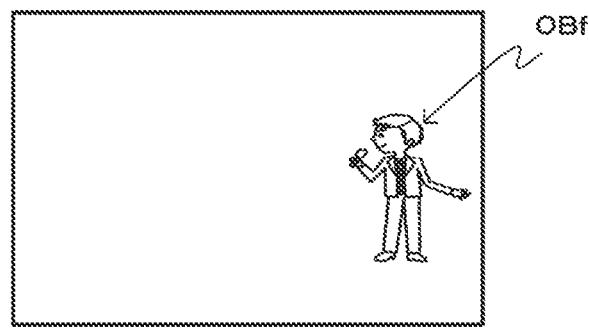
FIGS. 10(a), 10(b), and 10(c) Diagrams showing an example of an operation at a time when panning is performed.
Figure 10B:
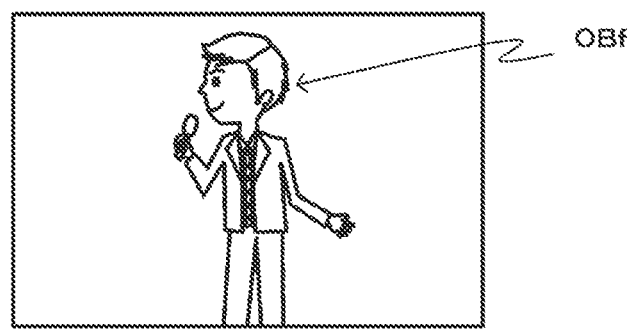
Figure 10C:
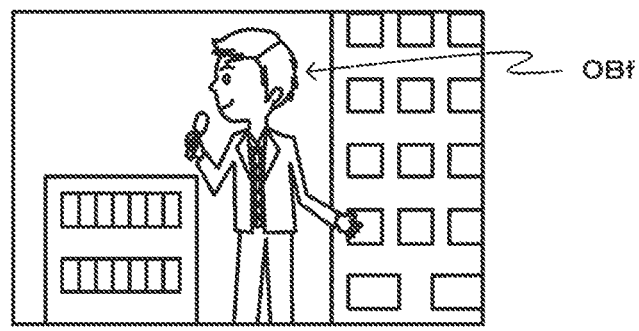

FIGS. 10(a), 10(b), and 10(c) exemplifies an operation in a case where the panning is performed. FIG. 10(a) exemplifies a pickup image before the panning. The image processing unit performs control or the like of the image pickup unit, and as shown in FIG. 10(b), generates a foreground image which is an actual image obtained by performing the panning so as to set the desired subject OBf to a center position and zooming in the subject OBf, and for which an influence of the panning is cancelled by projection transformation. Further, the image processing unit synthesizes the generated foreground image with the background image as the virtual image. Thus, as shown in FIG. 10(c), the synthesis image is such an image that the desired subject OBf is disposed on the center of the background, and a good resolution is achieved just like the object actually exist in the background.

Further, the operation of the image processing unit including not only the zooming but also the panning and tilting is not limited to the operation shown in FIG. 9. For example, the image processing unit detects, from a position in the pickup image of the foreground subject extracted by the foreground extraction unit, a pan component and a tilt component with the desired subject as the center position. After that, on a basis of the detected pan component and tilt component, the image processing unit may detect an optical scale component which does not cause the image frame clipping with the desired subject as the center position, and set the target value on a basis of each detected component.

It should be noted that the flowcharts shown in FIG. 5 and FIG. 9 exemplify the case where the temporary value is sequentially decreased until the image frame clipping is not caused, and the optimal optical scale component is determined with the maximum value of the optical scale component as the temporary value. However, the temporary value may be a minimum value of the optical scale component. In this case, the image processing unit sequentially increases the temporary value until the image frame clipping is caused, and sets an optical scale component immediately before the image frame clipping is caused as an optimal optical scale component. Further, the above embodiment exemplifies the operation in the case of zooming in the desired subject. However, in a case of a zoom-out operation, a scale component may also be adjusted in such a manner that the optical scale component is prioritized.

As described above, according to the present technology, one image pickup unit is capable of synthesizing a foreground image without causing image frame clipping with a good resolution from an entire image of a desired subject to a zoom-in image. Thus, it is unnecessary to provide an image pickup unit for capturing an entire image of a desired subject and an image pickup unit for obtaining a zoom-in image and switch the image pickup units in order to obtain an image with a good resolution, so an image processing system can be configured at a low cost. Further, higher quality of a synthesis image generated by the image processing system can be expected.

Further, if a marker is set on the desired subject, the background, or the like, a positional relationship with the image pickup unit is grasped at all times, and the virtual background image and the foreground image are synthesized, the image pickup unit that obtains the foreground image can generate a synthesis image with no deterioration of the resolution in cooperation with the virtual space. However, this method requires an expensive apparatus or the like for grasping a position to achieve an accurate position adjustment. However, in the present technology, setting a marker and an accurate position adjustment are unnecessary. Thus, it is possible to easily generate a synthesis image having a good resolution.

Further, when a user moves the virtual image pickup unit with the operation unit, an optical zoom of the image pickup unit that generates an actual image is automatically controlled. Thus, it is unnecessary to consciously operate the optical zoom, and it is possible to easily generate a synthesis image having a good resolution.

Further, even if a response delay is caused due to the optical zoom of the image pickup unit, the non-optical scale component, that is, the electronic zoom can absorb an influence of the delay, so a desired zoom operation can be achieved. Thus, irrespective of a restriction in terms of hardware, it is possible to generate a synthesis image in a case where the zoom operation is performed at an arbitrary speed or for an arbitrary time.

Further, the optical center in the optical zoom can be moved to the position of the desired subject in the actual image, so even in a case where an image pickup target or the virtual image pickup unit is moved to a position apart from the optical center, it is possible to generate a synthesis image having a good resolution. Further, the image synthesis can be performed by operating the virtual image pickup unit, so it is possible to generate a synthesis image without providing a camera operator.

The series of processes described in this description can be executed by hardware, software, or a composite configuration of those. In a case where the process is executed by software, a program in which a process sequence is recorded is installed in a memory in a computer incorporated in dedicated hardware and executed. Alternatively, the program can be installed in a general-purpose computer capable of executing various processes and executed.

For example, the program can be recorded in advance in a hard disk as a recording medium, an SSD (Solid State Drive), or a ROM (Read Only Memory). Alternatively, the program can be temporarily or eternally stored (recorded) in a flexible disk, a CD-ROM (Compact Disc Read Only Memory), an MO (Magneto optical) disc, a DVD (Digital Versatile Disc), a BD (Blu-Ray Disc (registered trademark)), a magnetic disk, a semiconductor memory card, or another removable recording medium. The removable recording medium can be provided as so-called package software.

Further, the program may be installed from a removable recording medium to a computer, or may be transferred to a computer from a download site via a network such as a LAN (Local Area Network) and the Internet in a wired or wireless manner. In the computer, the program transferred as described above can be received and installed in a recording medium such as an incorporated hard disk or the like.

It should be noted that the effects described in this specification are merely examples and are not limited, an additional effect that is not described may be obtained. Further, the present technology should not be interpreted by being limited to the above embodiments of the technology. The embodiments of this technology disclose the present technology as exemplifications, and it is obvious that persons skilled in the art can perform modification or substitution of the embodiments without departing from the gist of the present technology. That is, to determine the gist of the present technology, claims should be taken into consideration.

Further, the image processing apparatus of the present technology can take the following configurations.

(1) An image processing apparatus, including:
a scale transformation adjustment unit that performs a scale transformation in coordinate transformation to draw an actual image to be synthesized with a virtual image in a virtual space by using a scale transformation by an optical zoom of an image pickup unit that generates the actual image.

(2) The image processing apparatus according to (1), in which
the scale transformation adjustment unit performs the scale transformation in the coordinate transformation by using the scale transformation by the optical zoom and scale transformation not by the optical zoom, and performs an adjustment in such a manner that more scale transformation by the optical zoom is performed.

(3) The image processing apparatus according to (2), in which
the scale transformation adjustment unit adjusts the scale transformation by the optical zoom to prevent image clipping of a desired subject in the actual image in a synthesis image generated by the synthesis.

(4) The image processing apparatus according to any one of (1) to (3), further including:
an image pickup control unit that outputs a control signal corresponding to the scale transformation by the optical zoom to the image pickup unit, and causes the image pickup unit to generate an actual image that has been subjected to the scale transformation by the optical zoom.

(5) The image processing apparatus according to (4), in which
the scale transformation adjustment unit determines an image pickup direction to set an optical center of the optical zoom to a position of a desired subject in the actual image, and
the image pickup control unit performs control to set an image pickup direction of the image pickup unit to the direction determined by the scale transformation adjustment unit.

(6) The image processing apparatus according to (5), in which
the scale transformation adjustment unit adjusts coordinate transformation to draw the actual image in the virtual space in such a manner that control of the image pickup direction cancels an influence generated in the desired subject in the actual image.

(7) The image processing apparatus according to any one of (1) to (6), in which
the scale transformation adjustment unit obtains, from the image pickup unit, an information signal that enables a scale transformation state of the optical zoom to be determined, and in a case where the scale transformation state of the optical zoom determined on a basis of the information signal causes a difference with the scale transformation in the coordinate transformation, compensates for the difference by scale transformation not by the optical zoom.

(8) The image processing apparatus according to any one of (1) to (7), further including:
a coordinate transformation matrix generation unit that generates a coordinate transformation matrix corresponding to a position and a direction of a viewpoint in the virtual space and a zoom factor;
an image extraction unit that extracts an image of a desired subject from a pickup image generated by the image pickup unit as the actual image; and
an image synthesis unit that synthesizes the virtual image after coordinate transformation and the actual image extracted by the image extraction unit, in which
the scale transformation adjustment unit generates such a coordinate transformation matrix that the coordinate transformation matrix according to the zoom factor includes a scale transformation by the optical zoom on a basis of the coordinate transformation matrix generated by the coordinate transformation matrix generation unit, and
the image synthesis unit performs, for the virtual image, coordinate transformation by using the coordinate transformation matrix generated by the coordinate transformation matrix generation unit, and performs, for the actual image extracted by the image extraction unit, a coordinate transformation by using the coordinate transformation matrix generated by the scale transformation adjustment unit.

INDUSTRIAL APPLICABILITY

In the image processing apparatus, the image processing method, the program, and the image processing system of this technology, the scale transformation in the coordinate transformation to draw the actual image to be synthesized with the virtual image in the virtual space is performed by using the scale transformation by the optical zoom of the image pickup unit that generates the actual image. Therefore, it is possible to maintain the resolution of the actual image in the synthesis image of the actual image and the virtual image to be good. Thus, this is appropriate to a field of image production such as a virtual studio.

REFERENCE SIGNS LIST

10 image processing system
20 image pickup unit
30 operation unit
40 image processing unit
41 coordinate transformation matrix generation unit
42 scale transformation adjustment unit
43 image pickup control unit
44 foreground image extraction unit
45 background image holding unit
46 image synthesis unit
50 image display unit
91 greenback

The invention claimed is:

1. An image processing apparatus, comprising:
a processor;
a memory storing computer-executable instructions that, when executed by the processor, perform following operations:
obtain a first image and a first scale transformation state that is an optical zoom factor at which the first image was captured from a camera, wherein the first image includes a desired subject;
determine a second scale transformation state based on the optical zoom associated with the camera;
generate a first coordinate transformation matrix based on the first scale transformation state and the second scale transformation state;
set a subject area in the first image, wherein the set subject area includes the desired subject;
generate an adjusted subject area by transforming the subject area using the first coordinate transformation matrix with a scale transformation process associated with non-optical zoom;
generate a second coordinate transformation matrix that corresponds to a position of a viewpoint and a direction of the viewpoint in a virtual space, and a zoom factor associated with a virtual camera associated with the viewpoint;
transform the adjusted subject area and a virtual image using the second coordinate transformation matrix, wherein the virtual image is an image in the virtual space; and
generate a synthesized image based on the transformed adjusted subject area and the transformed virtual image.

2. The image processing apparatus according to claim 1, wherein the second scale transformation state is determined based on the scale transformation process associated with non-optical zoom.

3. The image processing apparatus according to claim 2, wherein the operations further comprise
prevent an image clipping process of the desired subject in generation of the synthesized image.

4. The image processing apparatus according to claim 1, wherein the operations further comprise:
output a control signal that changes the optical zoom factor for image capture; and
capture a second image using the camera based on the control signal.

5. The image processing apparatus according to claim 4, wherein the operations further comprise:
determine an expected position of the desired subject in a foreground plane in the virtual space based on the first coordinate transformation matrix;
determine an image pickup direction to set an optical center of the optical zoom to the expected position of the desired subject in the foreground plane; and
set the image pickup direction of the camera to the determined image pickup direction.

6. The image processing apparatus according to claim 5, wherein the operations further comprise
apply the second scale transformation state to draw the desired subject in the foreground plane before the determined image pickup direction is set.

7. An image processing method, comprising:

in an image processing apparatus:

obtaining a first image and a first scale transformation state that is an optical zoom factor at which the first image was captured from a camera, wherein the first image includes a desired subject;

determining a second scale transformation state based on the optical zoom associated with the camera;

generating a first coordinate transformation matrix based on the first scale transformation state and the second scale transformation state;

setting a subject area in the first image, wherein the set subject area includes the desired subject;

generating an adjusted subject area by transforming the subject area using the first coordinate transformation matrix with a scale transformation process associated with non-optical zoom;

generating a second coordinate transformation matrix that corresponds to a position of a viewpoint and a direction of the viewpoint in a virtual space, and a zoom factor associated with a virtual camera associated with the viewpoint;

transforming the adjusted subject area and a virtual image using the second coordinate transformation matrix, wherein the virtual image is an image in the virtual space; and generating a synthesized image based on the transformed adjusted subject area and the transformed virtual image.

8. A non-transitory computer-readable medium having stored thereon, computer executable instructions, which when executed by a processor, cause the processor to execute operations, the operations comprising:

obtaining a first image and a first scale transformation state that is an optical zoom factor at which the first image was captured from a camera, wherein the first image includes a desired subject;

determining a second scale transformation state based on the optical zoom associated with the camera;

generating a first coordinate transformation matrix based on the first scale transformation state and the second scale transformation state;

setting a subject area in the first image, wherein the set subject area includes the desired subject;

generating an adjusted subject area by transforming the subject area using the first coordinate transformation matrix with a scale transformation process associated with non-optical zoom;

generating a second coordinate transformation matrix that corresponds to a position of a viewpoint and a direction of the viewpoint in a virtual space, and a zoom factor associated with a virtual camera associated with the viewpoint;

transforming the adjusted subject area and a virtual image using the second coordinate transformation matrix, wherein the virtual image is an image in the virtual space; and generating a synthesized image based on the transformed adjusted subject area and the transformed virtual image.

9. An image processing system, comprising:

a camera;

a processor;

a memory storing computer-executable instructions that, when executed by the processor, perform following operations:

execute an operation for a position of a viewpoint in a virtual space, a direction of the viewpoint in the virtual space, and a zoom factor associated with a virtual camera, wherein the virtual camera is associated with the viewpoint;

obtain a first image and a first scale transformation state that is an optical zoom factor at which the first image was captured from the camera, wherein the first image includes a desired subject;

draw a virtual image and the first image based on the operation, wherein the virtual image is drawn in the virtual space;

determine a second scale transformation state based on the optical zoom associated with the camera;

generate a first coordinate transformation matrix based on the first scale transformation state and the second scale transformation state;

set a subject area in the first image, wherein the set subject area includes the desired subject;

generate an adjusted subject area by transforming the subject area using the first coordinate transformation matrix with a scale transformation process associated with non-optical zoom;

generate a second coordinate transformation matrix that corresponds to the position of the viewpoint and the direction of the viewpoint in the virtual space, and the zoom factor associated with the virtual camera associated with the viewpoint;

transform the adjusted subject area and the virtual image using the second coordinate transformation matrix, wherein the virtual image is an image in the virtual space; and generate a synthesized image based on the transformed adjusted subject area and the transformed virtual image output a control signal that changes the optical zoom factor for image capture; and capture a second image using the camera based on the control signal.

* * * * *